(12) United States Patent
Shiizuka et al.

(10) Patent No.: US 11,480,948 B2
(45) Date of Patent: Oct. 25, 2022

(54) MONITORING TARGET SELECTING DEVICE, MONITORING TARGET SELECTING METHOD, AND PROGRAM

(71) Applicant: MITSUBISHI HEAVY INDUSTRIES, LTD., Tokyo (JP)

(72) Inventors: Susumu Shiizuka, Tokyo (JP); Masumi Nomura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 212 days.

(21) Appl. No.: 16/650,174

(22) PCT Filed: Aug. 7, 2018

(86) PCT No.: PCT/JP2018/029635
§ 371 (c)(1),
(2) Date: Mar. 24, 2020

(87) PCT Pub. No.: WO2019/087508
PCT Pub. Date: May 9, 2019

(65) Prior Publication Data
US 2020/0225644 A1 Jul. 16, 2020

(30) Foreign Application Priority Data
Oct. 31, 2017 (JP) .............................. JP2017-210663

(51) Int. Cl.
*G05B 19/418* (2006.01)
*G06K 9/62* (2022.01)
*G21C 17/00* (2006.01)

(52) U.S. Cl.
CPC ..... *G05B 19/4183* (2013.01); *G05B 19/4188* (2013.01); *G05B 19/41865* (2013.01); *G06K 9/6267* (2013.01); *G21C 17/00* (2013.01)

(58) Field of Classification Search
CPC .............. G05B 19/418; G05B 19/4183; G05B 19/41865; G05B 19/4188; G05B 23/0275;
(Continued)

(56) References Cited

U.S. PATENT DOCUMENTS 6,408,259 B1  6/2002 Goebel et al.
8,838,324 B2 *  9/2014 Suzuki .................... E02F 9/267
714/39

(Continued)

FOREIGN PATENT DOCUMENTS

JP       8-220279 A     8/1996
JP     2017-62728 A     3/2017
(Continued)

OTHER PUBLICATIONS

International Search Report dated Nov. 6, 2018, issued in Application No. PCT/JP2018/029635, with English translation (7 pages).
(Continued)

*Primary Examiner* — Tung S Lau
(74) *Attorney, Agent, or Firm* — WHDA, LLP (57) ABSTRACT

A monitoring target selecting device configured to output a measurement parameter to an abnormality diagnosis device to diagnose an abnormal event of a plant based on a correlation value representing a mutual correlation between measurement parameters, and includes a classification unit to acquire a plurality of measurement parameters measured in the plant, classify a change behavior of measured value over a time for each of the plurality of measurement parameters in a first period, and classify a change behavior of a measured value over a time for each of the plurality of measurement parameters in each of the first period and a second period, and a selection unit to select the measurement parameter as a measurement parameter to be output to the abnormality diagnosis device on the basis of a result of
(Continued)

comparing a behavior of the measurement parameters in the first period to the second period.

8 Claims, 7 Drawing Sheets

(58) Field of Classification Search
CPC .. G05B 23/0232; G06K 9/6267; G21C 17/00; Y02E 30/30
See application file for complete search history.

(56) References Cited

U.S. PATENT DOCUMENTS

| | | | | |
|---|---|---|---|---|
| 2008/0188762 A1* | 8/2008 | John | ............ | A61B 5/349 600/513 |
| 2008/0188763 A1* | 8/2008 | John | ............ | A61B 5/349 600/516 |
| 2008/0228306 A1 | 9/2008 | Yetter et al. | | |
| 2018/0000428 A1* | 1/2018 | Swiston | ............ | A61B 5/02055 |
| 2018/0158556 A1 | 6/2018 | Azuma et al. | | |
| 2018/0174694 A1 | 6/2018 | Mashio et al. | | |
| 2018/0239345 A1* | 8/2018 | Noda | ............ | G05B 23/024 |
| 2021/0345970 A1* | 11/2021 | El-Baz | ............ | A61B 5/1075 |

FOREIGN PATENT DOCUMENTS

| | | | |
|---|---|---|---|
| JP | 2017-62730 A | | 3/2017 |
| WO | WO 2011092830 | * | 8/2011 |

OTHER PUBLICATIONS

Written Opinion of the International Searching Authority dated Nov. 6, 2018, issued Application No. PCT/JP2018/029635, with English translation (10 pages).

* cited by examiner

| MEASUREMENT PARAMETER | N CYCLE | N+1 CYCLE |
|---|---|---|
| A | RISING | RISING |
| B | RISING | CONSTANT |
| C | CONSTANT | CONSTANT |
| ... | ... | ... |

| FIRST MEASUREMENT PARAMETER | SECOND MEASUREMENT PARAMETER |
|---|---|
| AA LINE OUTLET FLOW RATE | BB PUMP BEARING TEMPERATURE |
| AA LINE OUTLET FLOW RATE | AA LINE INLET TEMPERATURE |
| AA LINE OUTLET FLOW RATE | CC LINE OUTLET TEMPERATURE |
| ... | ... |

A monitoring target selecting device which is configured to output a measurement parameter to an abnormality sign monitoring device that is configured to detect an abnormality sign of a plant on the basis of a correlation value representing a correlation between a plurality of the measurement parameters of the plant, the abnormality sign indicating that an operation state of the plant has a possibility to be abnormal.

/331 a classification unit configured to acquire a plurality of measurement parameters measured in the plant, classify a change behavior of measured value over a time for each of the plurality of measurement parameters in a first period, and classify a change behavior of a measured value over a time for each of the plurality of measurement parameters in a second period which is a period after the first period, wherein the classification unit is configured to classify the measurement parameter, on the basis of an inclination value of a measured value over a time, into a first behavior whose inclination value is equal to or greater than a classification threshold value, a second behavior whose absolute value of the inclination value is less than the classification threshold value, and a third behavior whose absolute value of the inclination value is equal to or greater than the classification threshold value when the inclination value is a negative value.

/332 a selection unit configured to, when the behavior of the measurement parameter in the first period is the same as the behavior of the measurement parameter in the second period, select this measurement parameter as a measurement parameter to be output to the abnormality sign monitoring device on the basis of a result of comparing a behavior of the measurement parameter in the first period and a behavior of the measurement parameter in the second period, and when a difference between the behavior of the measurement parameter in the first period and the behavior of the measurement parameter in the second period exists, determine whether the difference is normal or abnormal on the basis of information stored in a storage unit in advance, and select this measurement parameter as the measurement parameter to be output to the abnormality sign monitoring device in case that the difference is determined to be normal.

MONITORING TARGET SELECTING DEVICE, MONITORING TARGET SELECTING METHOD, AND PROGRAM

TECHNICAL FIELD

The present invention relates to a monitoring target selecting device, a monitoring target selecting method, and a program.

Priority is claimed on Japanese Patent Application No. 2017-210663, filed Oct. 31, 2017, the content of which is incorporated herein by reference.

BACKGROUND ART

In a nuclear power generation plant, an abnormality sign monitoring system acquires measurement information from a plurality of measurement devices provided in a control target, and acquires the acquired measurement information as plant operation data. In addition, the abnormality sign monitoring system detects an abnormality sign of the nuclear power generation plant on the basis of a correlation representing a mutual relationship between a plurality of acquired measurement parameters. Note that an abnormality diagnosis system includes a database, an abnormality sign monitoring system, and the like. The abnormality diagnosis system identifies an abnormal event and the like (abnormal event, facility with an abnormality sign, and abnormality countermeasure processing) of the nuclear power generation plant on the basis of an abnormality sign detection result and information of the database output from the abnormality sign monitoring system (for example, refer to Patent Document 1).

CITATION LIST

Patent Literature

[Patent Document] Japanese Unexamined Patent application, First Publication No. 2017-62730

SUMMARY OF INVENTION

Technical Problem

However, in the technology described in Patent Document 1, since the correlation breaks down when the measurement information changes discontinuously, such as when the plurality of measurement devices have different operation cycles, it may be difficult to detect an abnormality sign in an operation cycle accordingly. Moreover, abnormality detection in an operation cycle to be monitored may become inefficient due to abnormality detection (erroneous detection) caused by different operation cycles in the technology described in Patent Document 1.

The present invention provides a monitoring target selecting device, a monitoring target selecting method, and a program which can reduce erroneous detection and identify an abnormal event and the like effectively in an abnormality diagnosis system.

Solution to Problem

According to a first aspect of the present invention, a monitoring target selecting device is a monitoring target selecting device which is configured to output a measurement parameter to an abnormality diagnosis device that is configured to diagnose an abnormal event of a plant based on a correlation value representing a mutual correlation between measurement parameters output from the monitoring target selecting device, and includes a classification unit configured to acquire a plurality of measurement parameters measured in the plant, classify a change behavior of a measured value over a time for each of the plurality of measurement parameters in a first period, and classify a change behavior of a measured value over a time for each of the plurality of measurement parameters in each of the first period and a second period, and a selection unit configured to select a measurement parameter as a measurement parameter to be output to the abnormality diagnosis device on the basis of a result of comparing a behavior of the measurement parameter in the first period and a behavior of the measurement parameter in the second period.

In addition, according to a second aspect of the present invention, in the monitoring target selecting device, when the behavior of the measurement parameter in the first period is the same as a behavior of the measurement parameter in the second period, the classification unit, as a result of the comparison, may select this measurement parameter as the measurement parameter to be output to the abnormality diagnosis device, and, when the behavior of the measurement parameter in the first period is different from the behavior of the measurement parameter in the second period and the measurement parameter in the second period is normal, may select this measurement parameter as the measurement parameter to be output to the abnormality diagnosis device.

In addition, according to a third aspect of the present invention, in the monitoring target selecting device, the classification unit may classify the measurement parameter, on the basis of an inclination value of a measured value over a time, into a first behavior whose inclination value is equal to or greater than a classification threshold value, a second behavior whose absolute value of the inclination value is less than the classification threshold value, and a third behavior whose absolute value of the inclination value is equal to or greater than the classification threshold value when the inclination value is a negative value.

In addition, according to a fourth aspect of the present invention, in the monitoring target selecting device, when the classification results of the behavior of the measurement parameter in the first period and the behavior of the measurement parameter in the second period are the same, the classification unit may select the measurement parameter to be output to the abnormality diagnosis device.

In addition, according to a fifth aspect of the present invention, in the monitoring target selecting device, when a ratio or difference between mean values of the measurement parameter in each period is within a range of a first predetermined value in case that the behavior of the measurement parameter in the first period and the behavior of the measurement parameter in the second period are the second behavior, the classification unit may select the measurement parameter to be output to the abnormality diagnosis device.

In addition, according to a sixth aspect of the present invention, in the monitoring target selecting device, when a ratio or difference between respective inclination values is within a range of a second predetermined value in case that the behavior of the measurement parameter in the first period and the behavior of the measurement parameter in the second period are the first behavior, the classification unit may select the measurement parameter to be output to the abnormality diagnosis device.

In addition, according to a seventh aspect of the present invention, in the monitoring target selecting device, when respective inclination values are negative values and a ratio or difference between respective inclination values is within a range of a second predetermined value in case that the behavior of the measurement parameter in the first period and the behavior of the measurement parameter in the second period are the third behavior, the classification unit may select the measurement parameter to be output to the abnormality diagnosis device.

In addition, according to an eighth aspect of the present invention, the monitoring target selecting device further includes a storage unit configured to store the behavior of the measurement parameter in the first period and the behavior of the measurement parameter in the second period for each measurement parameter, wherein the selection unit refers to information stored in the storage unit, and selects the measurement parameter to be output to the abnormality diagnosis device when the behavior of the measurement parameter in the second period is normal: when the behavior of the measurement parameter in the first period is different from the behavior of the measurement parameter in the second period; when a ratio or difference between mean values of the measurement parameter in each period is outside the range of a first predetermined value in case that the behavior of the measurement parameter in the first period and the behavior of the measurement parameter in the second period are the second behavior; when a ratio between respective inclination values is outside a predetermined range in case that the behavior of the measurement parameter in the first period and the behavior of the measurement parameter in the second period are the first behavior; or when respective inclination values are negative values and a ratio or difference between respective inclination values is outside the range of a second predetermined value in case that the behavior of the measurement parameter in the first period and the behavior of the measurement parameter in the second period are the third behavior.

In addition, according to a ninth aspect of the present invention, a monitoring target selecting method of a monitoring target selecting device which is configured to output a measurement parameter to an abnormality diagnosis device that is configured to diagnose an abnormal event of a plant based on a correlation value representing a mutual correlation of measurement parameters output by the monitoring target selection device includes a step of acquiring, by a classification unit, a plurality of measurement parameters measured in the plant and classifying a change behavior of a measured value over a time for each of the plurality of measurement parameters in a first period, a step of classifying, by the classification unit, a change behavior of a measured value over a time for each of the plurality of measurement parameters in each of the first period and a second period, and a step of selecting, by a selection unit, the measurement parameter to be output to the abnormality diagnosis device on the basis of a result of comparing a behavior of the measurement parameter in the first period and a behavior of the measurement parameter in the second period.

In addition, according to a tenth aspect of the present invention, a program causes a computer of a monitoring target selecting device which is configured to output a measurement parameter to an abnormality diagnosis device that is configured to diagnose an abnormal event of a plant based on a correlation value representing a mutual correlation of measurement parameters output by the monitoring target selection device to execute a procedure of acquiring a plurality of measurement parameters measured in the plant and classifying a change behavior of a measured value over a time for each of the plurality of measurement parameters in a first period, a procedure of classifying a change behavior of a measured value over a time for each of the plurality of measurement parameters in each of the first period and a second period, and a procedure of selecting the measurement parameter to be output to the abnormality diagnosis device on the basis of a result of comparing a behavior of the measurement parameter in the first period and a behavior of the measurement parameter in the second period.

Advantageous Effects of Invention

According to at least one of the aspects described above, the monitoring target selecting device can reduce erroneous detection and identify an abnormal event and the like effectively in the abnormality diagnosis system.

DESCRIPTION OF EMBODIMENTS

Hereinafter, embodiments of the present invention will be described with reference to the drawings.

Figure 1:
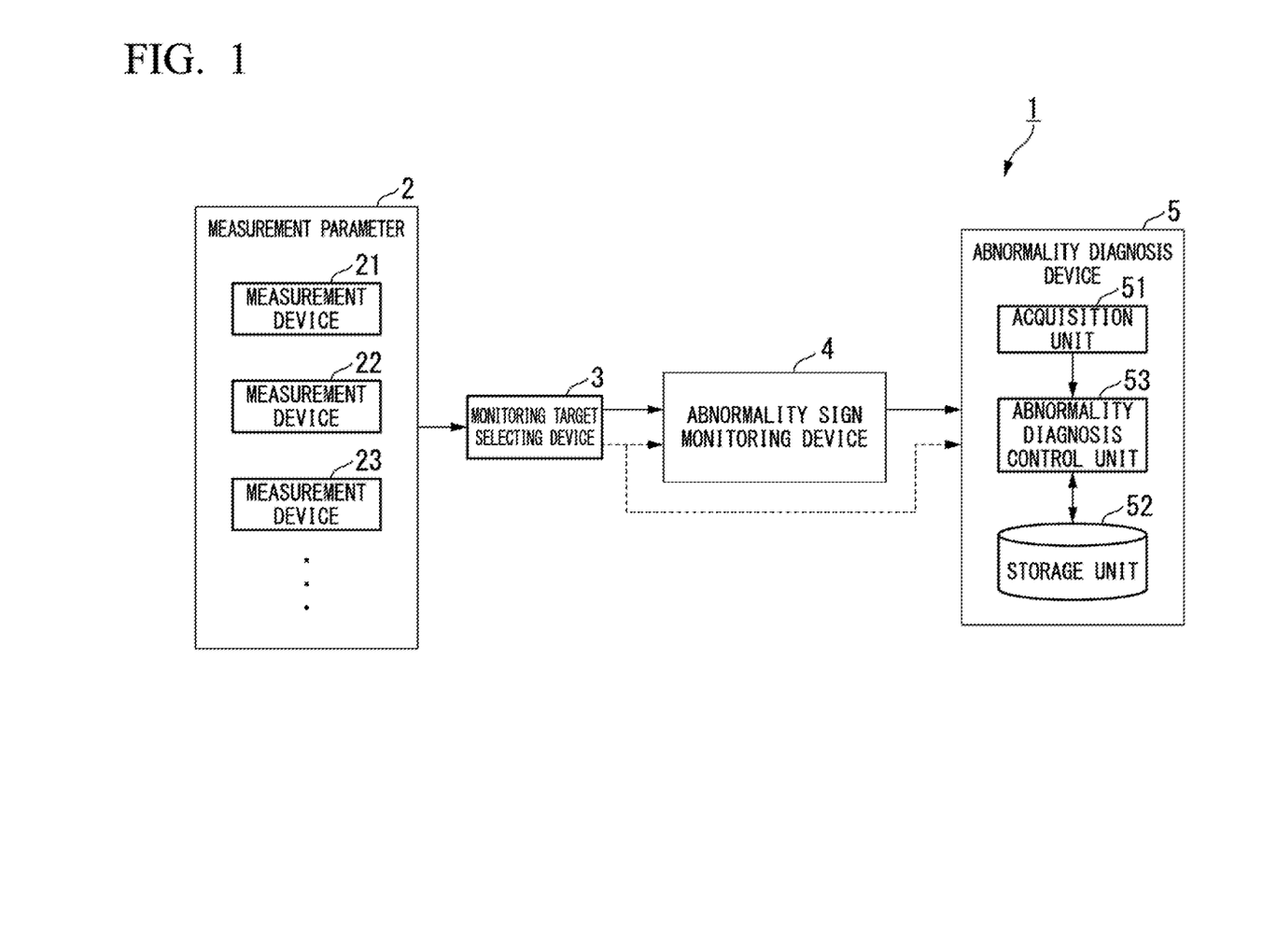
FIG. 1 is a diagram which shows a configuration example of an abnormality diagnosis system according to the present embodiment.

FIG. 1 is a diagram which shows a configuration example of an abnormality diagnosis system 1 according to the present embodiment. As shown in FIG. 1, the abnormality diagnosis system 1 includes a monitoring target selecting device 3, an abnormality sign monitoring device 4, and an abnormality diagnosis device 5. Note that an example in which the abnormality diagnosis system 1 is applied to a nuclear power generation plant will be described in the present embodiment.

In addition, the abnormality diagnosis device 5 includes an acquisition unit 51, a storage unit 52, and an abnormality diagnosis control unit 53.

The abnormality diagnosis system 1 acquires measurement parameters output from each of a plurality of measurement devices 21, 22, 23, . . . , and so forth provided in the nuclear power generation plant as plant operation data. The abnormality diagnosis system 1 diagnoses abnormality of a nuclear power generation plant having a nuclear reactor on the basis of the acquired measurement parameters. Here, the measurement devices 21, 22, 23, . . . , and so forth are devices that measure, for example, a pump pressure, an injected flow rate, an output flow rate, a water level, a pump bearing temperature, and the like.

The monitoring target selecting device 3 acquires measurement parameters from each of the measurement devices 21, 22, 23, . . . , and so forth. The monitoring target selecting device 3 determines whether each of the acquired measurement parameters is an output target. The monitoring target selecting device 3 selects a measurement parameter determined as an output target and outputs the selected measurement parameter to the abnormality sign monitoring device 4. Note that a configuration, a determination method, and the like of the monitoring target selecting device 3 will be described below.

The abnormality sign monitoring device 4 detects, for example, an abnormality sign of the nuclear power generation plant on the basis of a correlation value representing a correlation between the plurality of acquired measurement parameters. The abnormality sign monitoring device 4 outputs a detection result of the detected abnormality sign to the abnormality diagnosis device 5. The detection result of the abnormality sign includes, for example, a parameter transition, a parameter contribution degree, a position of a measurement parameter on a system, and the like. Note that a configuration, a determination method, and the like of the abnormality sign monitoring device 4 will be described below.

The abnormality diagnosis device 5 identifies an abnormal event of the nuclear power generation plant on the basis of the detection result of the abnormality sign output from the abnormality sign monitoring device 4 and an operation history of the nuclear power generation plant in the past stored in its own device.

The acquisition unit 51 acquires the detection result of the abnormality sign output from the abnormality sign monitoring device 4.

The storage unit 52 stores various types of information generated on the basis of the operation history of the nuclear power generation plant in the past. For example, the storage unit 52 stores an abnormal event of the nuclear power generation plant, an abnormality sign facility associated with the abnormal event, and abnormality countermeasure processing associated with the abnormal event. In addition, the storage unit 52 stores a parameter transition for determination associated with the abnormal event and a parameter contribution degree for determination associated with the abnormal event. Note that the parameter transition for determination and the parameter contribution degree for determination are generated on the basis of the operation history of the nuclear power generation plant in the past.

The abnormality diagnosis control unit 53 identifies an abnormal event and the like of the nuclear power generation plant by comparing and collating (that is, performing matching determination) the acquired detection result of the abnormality sign with various types of information stored by the storage unit 52. For example, the abnormality diagnosis control unit 53 compares the parameter transition, the parameter contribution degree, and the position of a measurement parameter on the system included in the acquired detection result of the abnormality sign with a parameter transition, a parameter contribution degree, and a position of a measurement parameter on the system stored by the storage unit 52. As a result of comparing these, if there is a parameter transition, a parameter contribution degree, and a position of a measurement parameter on the system matching in the detection result of the abnormality sign, the abnormality diagnosis control unit 53 identifies an abnormal event associated with the matched parameter transition, parameter contribution degree, and position of a measurement parameter on the system. Furthermore, the abnormality diagnosis control unit 53 identifies an abnormality sign facility and abnormality countermeasure processing associated with the identified abnormal event.

Note that an abnormality diagnosis method of the abnormality diagnosis device 5 described above is an example, and is not limited thereto.

Figure 2:
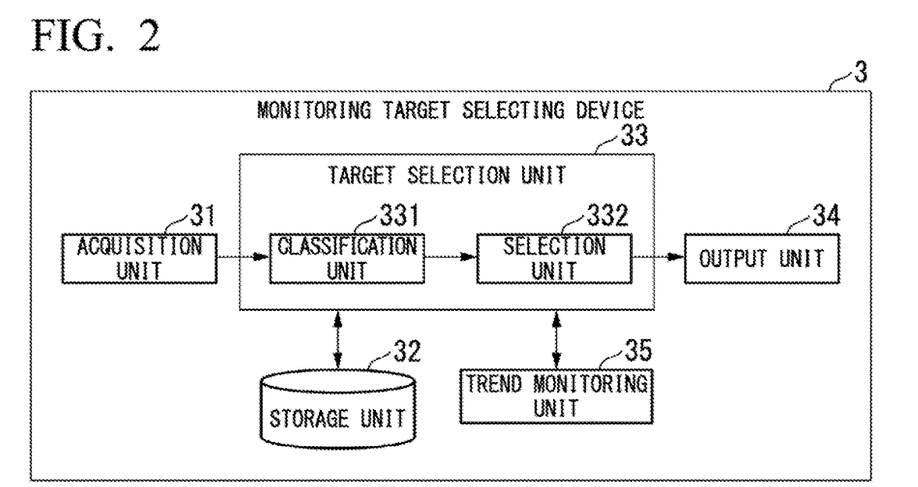
FIG. 2 is a diagram which shows a configuration example of a monitoring target selecting device according to the present embodiment.

Next, a configuration example and an operation example of the monitoring target selecting device 3 will be described.

Figure 12:
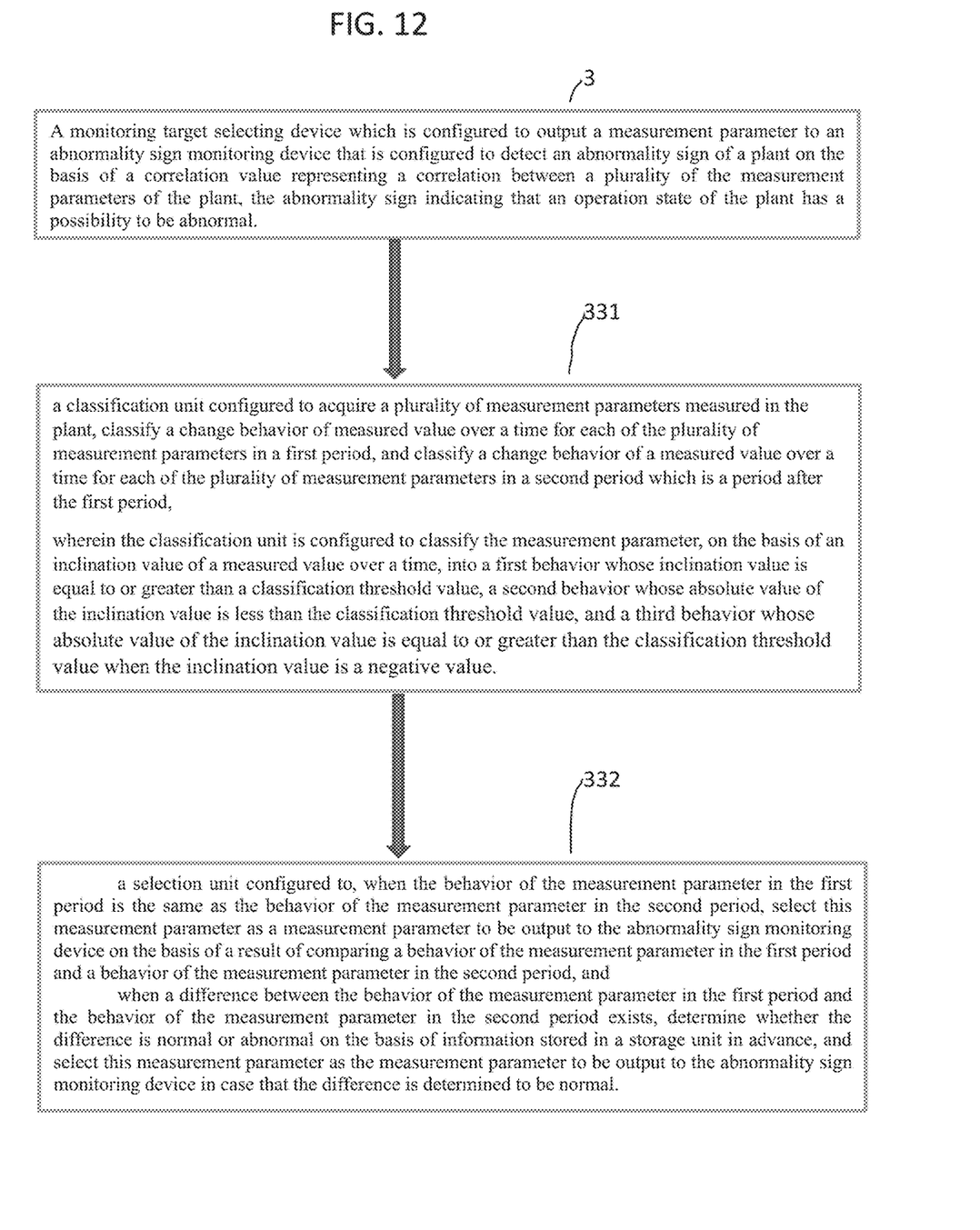
FIG. 12 is a diagram which shows a configuration example of an abnormality diagnosis system according to the present embodiment.

FIG. 2 is a diagram which shows a configuration example of the monitoring target selecting device 3 according to the present embodiment. As shown in FIG. 2, the monitoring target selecting device 3 includes an acquisition unit 31, a storage unit 32, a target selection unit 33, an output unit 34, and a trend monitoring unit 35. In addition, the target selection unit 33 includes a classification unit 331 and a selection unit 332. See also FIG. 12.

The acquisition unit 31 acquires measurement parameters from each of the measurement devices 21, 22, 23, . . . , and so forth.

The target selection unit 33 selects a measurement parameter that is an output target for each of the measurement parameters acquired by the acquisition unit 31.

The classification unit 331 classifies a chronological change (behavior) of an N cycle (a first period) for each acquired measurement parameter. In addition, the classification unit 331 classifies a chronological change (behavior) of an N+1 cycle (a second period) for the acquired measurement parameter. Here, the N cycle is, for example, thirteen months, and the N+1 cycle is, for example, one week. In this manner, the N+1 cycle (the second period) may be a period shorter than the N cycle (the first period). The classification unit 331 obtains an inclination by, for example, linearly approximating a change of a measurement parameter over a time. The classification unit 331 classifies the behavior on the basis of a size of the inclination. A type of the behavior includes, for example, "rising" in which a measurement value increases as time elapses, "constant" in which a measurement value is within a range of a predetermined value as time elapses, and "falling" in which a measurement value decreases as time elapses.

The selection unit 332 determines whether a classification result (hereinafter, referred to as a classification result of the N cycle) of the behavior in the N cycle classified by the classification unit 331 matches or is different from the classification result (hereinafter, referred to as a classification result of the N+1 cycle) of the behavior in the N+1 cycle. The selection unit 332 determines that the measurement parameter is an evaluation target when the classification result of the N cycle is different from the classification result of the N+1 cycle. When the classification result of the N cycle matches the classification result of the N+1 cycle, the selection unit 332 obtains a first mean value of a measurement parameter in the N cycle and a second mean value of the measurement parameter in the N+1 cycle, and determines whether the obtained first mean value and second mean value are the same as or different from each other. Note that the selection unit 332 determines that the first mean value and the second mean value are the same, for example, when a ratio or difference between the first mean value and the second mean value is within a range of a predetermined value. The selection unit 332 determines that the measurement parameter is an evaluation target when the first mean value and the second mean value are different. The selection unit 332 obtains a first inclination of a measurement parameter over a time in the N cycle and a second inclination of the measurement parameter over a time in the N+1 cycle when the classification result of the N cycle matches the classification result of the N+1 cycle, and determines whether the obtained first inclination and second inclination are the same as or different from each other. When the first inclination and the second inclination are different, the selection unit 332 determines that the measurement parameter is an evaluation target. When the classification result of the N cycle matches the classification result of the N+1 cycle, when the first mean value matches the second mean value, and when the first inclination matches the second inclination, the selection unit 332 determines that the measurement parameter is an output target (out-of-evaluation target) and outputs the acquired measurement parameter to the abnormality sign monitoring device 4 via the output unit 34. Note that the classification unit 331 may classify the behavior after standardizing the measured value using maximum and minimum values of the plurality of measurement parameters at the time of classifying the plurality of measurement parameters.

Furthermore, with respect to the measurement parameter determined as an evaluation target, the selection unit 332 determines whether it is normal or abnormal by comparing the information stored in the storage unit 32 that the classification result of the N cycle and the classification result of the N+1 cycle are different from each other, that the first mean value and the second mean value are different from each other, or that the first inclination and the second inclination are different from each other. When it is determined to be normal and the monitoring target selecting device 3 acquires a measurement parameter that does not require monitoring, the selection unit 332 outputs the acquired measurement parameter to the abnormality sign monitoring device 4 via the output unit 34. When it is determined to be abnormal or the monitoring target selecting device 3 acquires a measurement parameter that requires monitoring, the selection unit 332 outputs the acquired measurement parameter to the trend monitoring unit 35.

The storage unit 32 stores a classification threshold value for classifying measurement data. The storage unit 32 stores a classification result of the behavior of the N cycle and a classification result of the behavior of the N+1 cycle during a normal operation for each measurement parameter. The storage unit 32 stores an operation state of the N cycle and an operation state of the N+1 cycle. Note that the operation states include states before an inspection, after the inspection, before a replacement of the device, and after the replacement of the device, a state in which work has been performed, a state in which work has not been performed, and the like. The storage unit 32 stores the classification result of the behavior in the N cycle and the classification result of the behavior in the N+1 cycle for each measurement parameter.

The output unit 34 outputs the measurement parameter selected by the target selection unit 33 to the abnormality sign monitoring device 4.

The trend monitoring unit 35 performs measurement parameter monitoring (trend monitoring) and the like on the measurement parameter output by the selection unit 332. The trend monitoring unit 35 may output information indicating a result of the monitoring and the monitored measurement parameter to the abnormality sign monitoring device 4 or the abnormality diagnosis device 5 as a broken line of FIG. 1. Alternatively, the trend monitoring unit 35 may be displayed on a displayer (not shown) included therein.

Next, an example of classifying a measurement parameter will be described.

Figure 3:
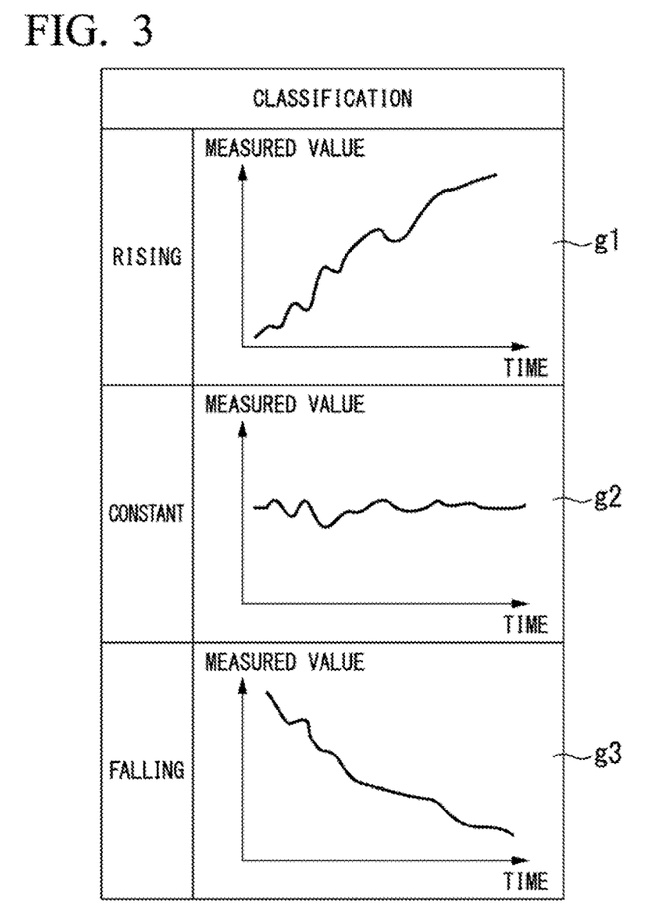
FIG. 3 is a diagram which shows an example of classifying a measurement parameter according to the present embodiment.

FIG. 3 is a diagram which shows an example of classifying a measurement parameter according to the present embodiment. In FIG. 3, the horizontal axis represents time and the vertical axis represents a measured value.

A reference numeral g1 is an example in which a state (behavior) of a chronological change increases. The classification unit 331 determines that the classification result of the behavior is "rising" (a first behavior) when the size of the inclination obtained by linear approximation is equal to or greater than the classification threshold value.

A reference numeral g2 is an example in which the state (behavior) of a chronological change is constant. The classification unit 331 determines that the classification result of the behavior is "constant" (a second behavior) when an absolute value of the size of the inclination obtained by linear approximation is less than the classification threshold value.

A reference numeral g3 is an example in which the state (behavior) of a chronological change decreases. The classification unit 331 determines that the classification result of the behavior is "falling" (a third behavior) when the inclination obtained by linear approximation is a negative value and the absolute value of the inclination is equal to or greater than the classification threshold value.

Next, the example of classifying a measurement parameter will be described.

Figure 4:
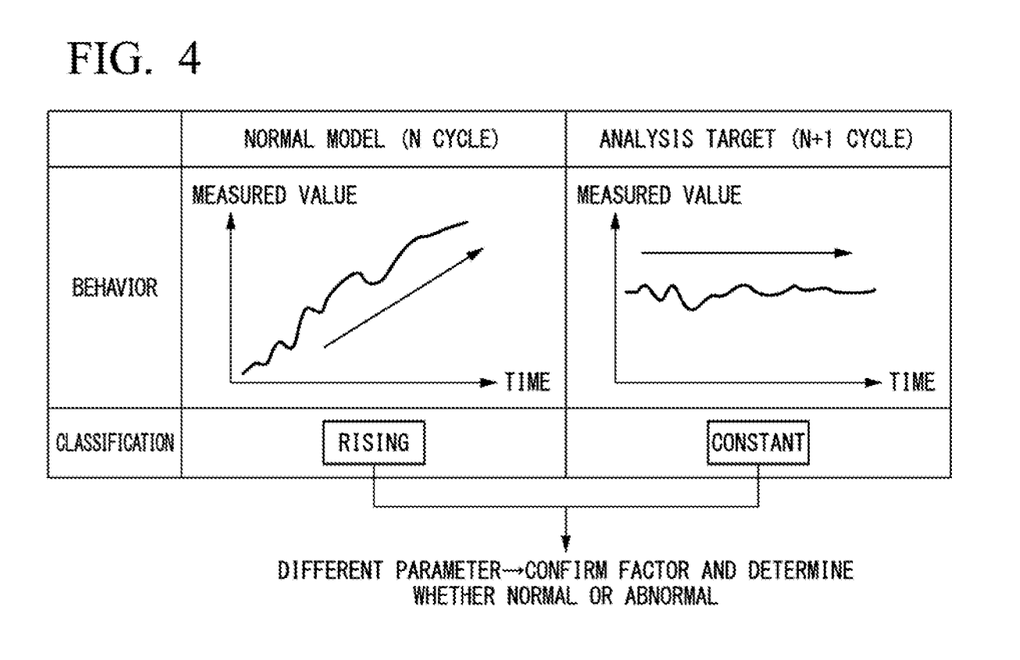
FIG. 4 is a diagram which shows an example of changing a behavior in an N cycle and an N+1 cycle according to the present embodiment.

FIG. 4 is a diagram which shows an example of changing the behavior in the N cycle and the N+1 cycle according to the present embodiment.

In the example shown in FIG. 4, a behavior of the N cycle is "rising" and a behavior of the N+1 cycle is "constant." Note that the behavior in the N cycle is a behavior when normal. Then, the behavior in the N+1 cycle is an analysis target of the monitoring target selecting device 3.

As described above, in the same measurement parameter, when the classification result of the behavior of the N cycle is different from the classification result of the behavior of the N+1 cycle, the selection unit 332 confirms a factor in which the classification results of the behaviors are different, and determines whether the difference is normal or abnormal. Here, the factor is, for example, when a measurement parameter of the N cycle is before work inspection and a measurement parameter of the N+1 cycle is after inspection, when the measurement parameter of the N cycle is before the replacement of the device, and the measurement parameter of the N+1 cycle is after the replacement of the device, or the like.

For example, it may be normal that the behavior of the N+1 cycle in a period (for example, one week) is constant after restarting of the device. In addition, it may be normal that the behavior of the N+1 cycle is constant after the replacement of the device.

Next, an information example stored by the storage unit 32 will be described.

Figure 5:
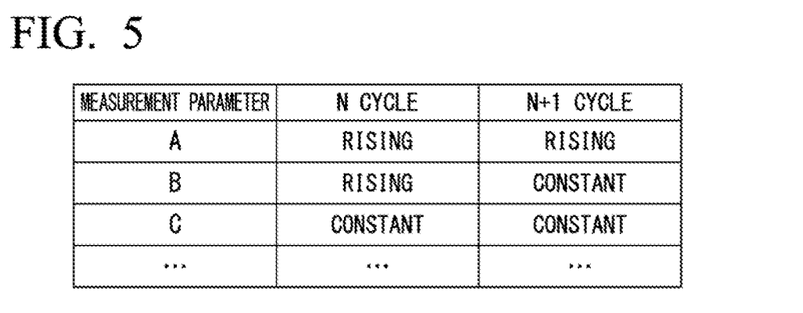
FIG. 5 is a diagram which shows an information example stored by a storage unit according to the present embodiment.

FIG. 5 is a diagram which shows an information example stored by the storage unit 32 according to the present embodiment.

As shown in FIG. 5, the storage unit 32 stores classification results of the behaviors of the N cycle and the N+1 cycle classified by the classification unit 331. For example, the storage unit 32 stores a measurement parameter A in association with the "rising" of the classification result of the behavior of the N cycle and "rising" of the classification result of the behavior of the N+1 cycle. The storage unit 32 stores a measurement parameter C in association with "constant" of the classification result of the behavior of the N cycle and "constant" of the classification result of the behavior of the N+1 cycle.

Next, an example of a processing procedure performed by the monitoring target selecting device 3 will be described.

Figure 6:
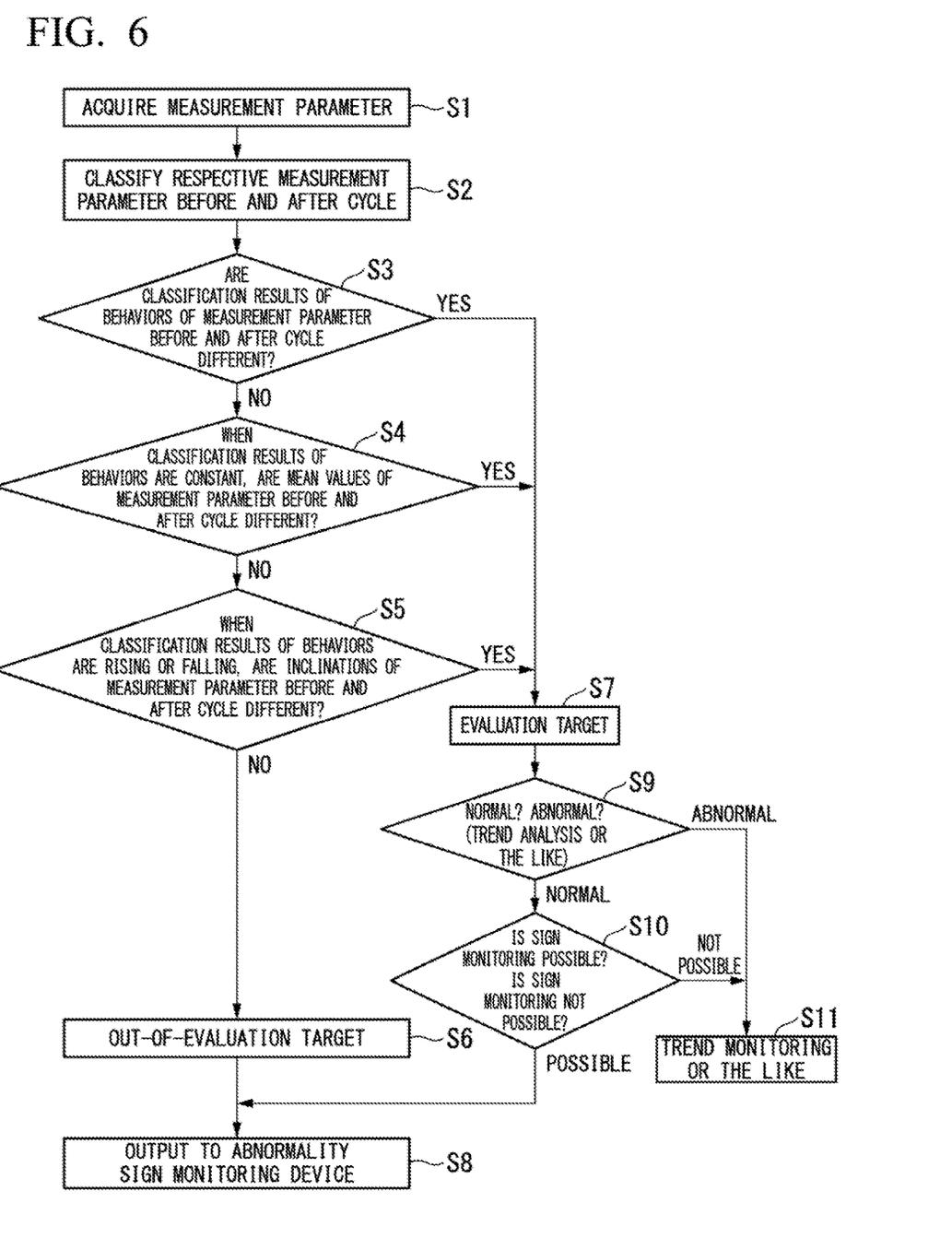
FIG. 6 is a flowchart which shows an example of a processing procedure performed by the monitoring target selecting device according to the present embodiment.

FIG. 6 is a flowchart which shows an example of a processing procedure performed by the monitoring target selecting device 3 according to the present embodiment. Note that the monitoring target selecting device 3 performs the following processing on each measurement parameter.

(Step S1) The acquisition unit 31 acquires measurement parameters from each of the measurement devices 21, 22, 23, . . . , and so forth.

(Step S2) The classification unit 331 classifies the chronological change (behavior) of the N cycle. In addition, the classification unit 331 classifies the chronological change (behavior) of the N+1 cycle.

(Step S3) The selection unit 332 determines whether a classification result of the behavior of the N cycle is different from a classification result of the behavior of the N+1 cycle. The selection unit 332 proceeds to processing of step S7 when it is determined that the classification result of the behavior of the N cycle is different from the classification result of the behavior of the N+1 cycle (YES in step S3). The selection unit 332 proceeds to processing of step S4 when it is determined that the classification result of the behavior of the N cycle is the same as the classification result of the behavior of the N+1 cycle (NO in step S3).

(Step S4) The selection unit 332 obtains a mean value of the measurement parameter in the N cycle and obtains a mean value of the measurement parameter in the N+1 cycle when both the classification result of the behavior of the N cycle and the classification result of the behavior of the N+1 cycle are "constant." Subsequently, the selection unit 332 determines whether the mean value of the measurement parameter in the N cycle is different from the mean value of the measurement parameter in the N+1 cycle. For example, the selection unit 332 determines that the mean values are the same when a ratio or difference between the mean value of a measurement parameter in the N cycle and the mean value of the measurement parameter in the N+1 cycle is within a range of a first predetermined value. In addition, the selection unit 332 determines that the mean values are different when the ratio or difference between the mean value of a measurement parameter in the N cycle and the mean value of the measurement parameter in the N+1 cycle is outside the range of the first predetermined value. When the selection unit 332 has determined that the mean value of a measurement parameter in the N cycle and the mean value of the measurement parameter in the N+1 cycle are different from each other (YES in step S4), the procedure proceeds to the processing of step S7. When the selection unit 332 has determined that the mean value of a measurement parameter in the N cycle and the mean value of the measurement parameter in the N+1 cycle are the same as each other (NO in step S4), the procedure proceeds to processing of step S5.

(Step S5) The selection unit 332 obtains an inclination of the measurement parameter over a time in the N cycle using, for example, linear approximation, and obtains an inclination of the measurement parameter over a time in the N+1 cycle using, for example, linear approximation, when both the classification result of the behavior of the N cycle and the classification result of the behavior of the N+1 cycle are "rising" or "falling." Subsequently, the selection unit 332 determines whether the inclination in the N cycle is different from the inclination in the N+1 cycle. For example, the selection unit 332 determines that the inclinations are the same when a ratio or difference between the inclination in the N cycle and the inclination in the N+1 cycle is within a range of a second predetermined value. In addition, the selection unit 332 determines that the inclinations are different when the ratio or difference between the inclination in the N cycle and the inclination in the N+1 cycle is outside the range of the second predetermined value. Note that the second predetermined values may be the same value or different values for "rising" and "falling." When the selection unit 332 has determined that the inclination in the N cycle and the inclination in the N+1 cycle are different (YES in step S5), the procedure proceeds to the processing of step S7. When the selection unit 332 has determined that the inclination in the N cycle and the inclination in the N+1 cycle are the same (NO in step S5), the procedure proceeds to processing of step S6.

(Step S6) When the classification result of the behavior of the N cycle is the same as the classification result of the behavior of the N+1 cycle, when the mean value of a measurement parameter in the N cycle is the same as the mean value of the measurement parameter in the N+1 cycle, or when the inclination of a measurement parameter in the N cycle is the same as the inclination of the measurement parameter in the N+1 cycle, the selection unit 332 selects this measurement parameter as an out-of-evaluation target. After the selection, the selection unit 332 proceeds to processing of step S8.

(Step S7) When the classification result of the behavior of the N cycle is different from the classification result of the behavior of the N+1 cycle, when the mean value of a measurement parameter in the N cycle is different from the mean value of the measurement parameter in the N+1 cycle, or when the inclination of a measurement parameter in the N cycle is different from the inclination of the measurement parameter in the N+1 cycle, the selection unit 332 selects this measurement parameter as an evaluation target. After the selection, the selection unit 332 proceeds to processing of step S9.

(Step S8) The selection unit 332 outputs the selected measurement parameter to the abnormality sign monitoring device 4. The monitoring target selecting device 3 ends the processing.

(Step S9) The selection unit 332 determines whether it is normal or abnormal that the behavior of the N cycle and the behavior of the N+1 cycle of the measurement parameter selected as an evaluation target in step S7 are different from each other on the basis of the information stored in the storage unit 32. Alternatively, the selection unit 332 determines whether it is normal or abnormal that the mean value of the measurement parameter in the N cycle is different from the mean value of the measurement parameter in the N+L cycle, which is set as an evaluation target in step S7, on the basis of the information stored in the storage unit 32. Alternatively, the selection unit 332 determines whether it is normal or abnormal that the inclination in the N cycle and the inclination in the N+1 cycle of the measurement parameter that is selected as an evaluation target in step S7 are different from each other on the basis of the information stored in the storage unit 32. The selection unit 332 proceeds to processing of step S10 when it is determined to be normal (normal in step S9), and proceeds to processing of step 11 when it is determined to be abnormal (abnormal in step S9).

(Step S10) The selection unit 332 determines whether measurement parameter monitoring determined to be normal is necessary on the basis of the information stored in the storage unit 32. The selection unit 332 proceeds to the processing of step S8 when it is determined that the monitoring is not necessary (step S10; sign monitoring is possible). The selection unit 332 proceeds to processing of step S11 when it is determined that the monitoring is necessary (step S10; sign monitoring is not possible). This means that the selection unit 332 determines whether the difference in classification result of the behavior in the N+1 cycle is temporary or continuous. If the classification result of the behavior is continuously different, the selection unit 332 determines that it is an out-of-target because monitoring is not necessary.

(Step S11) The selection unit 332 outputs the measurement parameter to the trend monitoring unit 35. The trend monitoring unit 35 performs trend monitoring and the like on the measurement parameter output from the selection unit 332.

Note that, in the processing described above, when the classification results of the behavior of the measurement parameter of the N cycle and the N+1 cycle are the same in step S3, the selection unit 332 may select this measurement parameter and output the selected measurement parameter to the abnormality sign monitoring device 4.

In addition, in the processing described above, when the mean values of the measurement parameter of the N cycle and the N+1 cycle are the same in step S4, the selection unit 332 may select this measurement parameter and output the selected measurement parameter to the abnormality sign monitoring device 4.

Moreover, in the processing described above, when the classification results of a measurement parameter of the N cycle and the N+1 cycle are the same in step S3 or when the inclinations of a measurement parameter of the N cycle and the N+1 cycle are the same in step S5, the selection unit 332 may select this measurement parameter and output the selected measurement parameter to the abnormality sign monitoring device 4.

Here, a reason for performing the processing of step S9 will be further described.

Even if the behavior of the N cycle that is a normal behavior and the behavior of the N+1 cycle are different from each other, as the behavior of the measured value, the difference may be normal in some cases. For example, when the measurement device 21 is replaced after an operation of the N cycle, the behavior of the N+1 cycle may be different from the behavior of the N cycle. In addition, for example, when work is performed in a period of the N+1 cycle, the behavior of the N+1 cycle may be different from the behavior of the N cycle. The purpose of processing of step S9 is to select a normal measurement parameter to be output to the abnormality sign monitoring device 4 as described above.

Note that, an example in which the classification unit 331 performs linear approximation on the measurement parameter to classify the behavior into three types has been described in the example described above, but the present invention is not limited thereto. The classification unit 331 may perform second-order approximation, third-order approximation on the measured value over a time to classify the behavior. Alternatively, the behavior having a change during a predetermined time is stored in the storage unit 32, and the classification unit 331 may classify the behavior with reference to the information stored in the storage unit 32. The behavior having a change during a predetermined time is, for example, a trapezoidal behavior, a behavior that repeats a plurality of times of rising and falling, a behavior that repeats a high measured value and a low measured value like a rectangular wave, or the like. In addition, the classification unit 331 may classify the behavior into two types or more, or may classify the behavior into 4 types or more.

Figure 7:
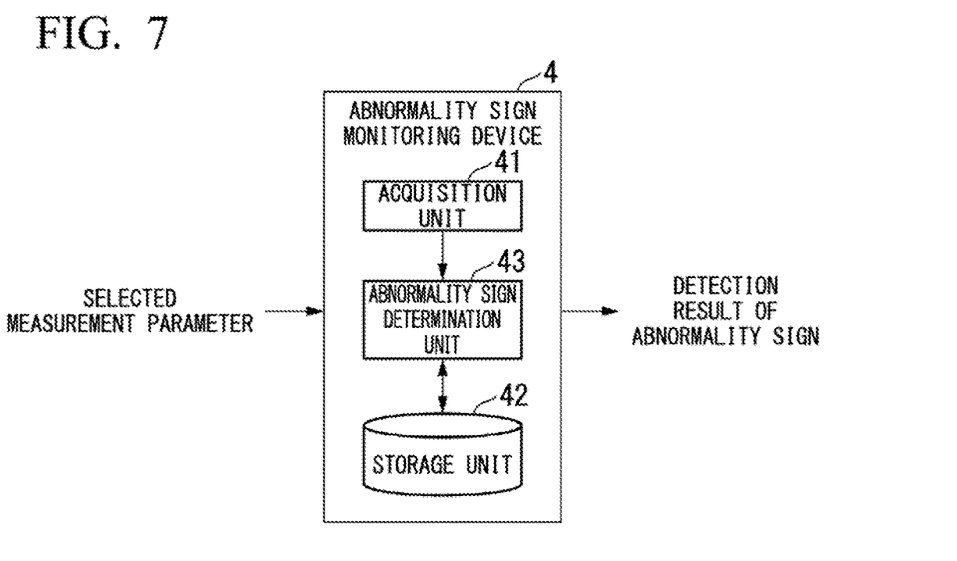
FIG. 7 is a diagram which shows a configuration example of an abnormality sign monitoring device according to the present embodiment.

Next, a configuration example and an operation example of the abnormality sign monitoring device 4 will be described.

FIG. 7 is a diagram which shows a configuration example of the abnormality sign monitoring device 4 according to the present embodiment. As shown in FIG. 7, the abnormality sign monitoring device 4 includes an acquisition unit 41, a storage unit 42, and an abnormality sign determination unit 43.

The acquisition unit 41 acquires a measurement parameter output and selected by the monitoring target selecting device 3. The storage unit 42 stores the measurement parameters acquired by the acquisition unit 41 according to time series for each measurement parameter. In addition, the storage unit 42 stores a threshold value for determining whether there is an abnormality sign. The storage unit 42 stores a predicted value of a change in measured value according to time and an actual value when normal for each measurement parameter. Furthermore, the storage unit 42 stores a deviation threshold value between the actual value and the predicted value for each measurement parameter.

The abnormality sign determination unit 43 derives each correlation value representing correlation strength of two measurement parameters among the plurality of measurement parameters. The abnormality sign determination unit 43 uses a correlation value obtained by adding all the derived correlation values of the measurement parameters as an abnormality indication value. The abnormality sign determination unit 43 determines (detects) that there is an abnormality sign when the monitoring indication value has exceeded the alarm transmission threshold value. The abnormality sign determination unit 43 determines (does not detect) that there is no abnormality sign when the monitoring indication value is equal to or less than the alarm transmission threshold value. The abnormality sign determination unit 43 outputs a result of detecting an abnormality sign to the abnormality diagnosis device 5 when it is detected that there is an abnormality sign. Note that an abnormality index value is an index of a degree of abnormality. Moreover, the alarm transmission threshold value is a threshold value for determining whether there is an abnormality sign.

Next, an outline of the processing procedure of the sign monitoring performed by the abnormality sign monitoring device 4 will be described.

The abnormality sign determination unit 43 selects two measurement parameters among the plurality of measurement parameters.

Figure 8:
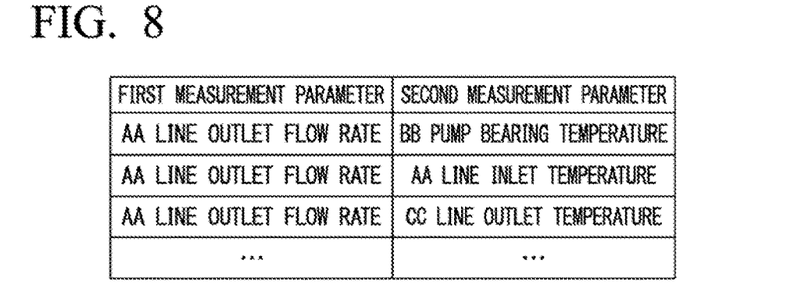
FIG. 8 is a diagram which shows an example of two measurement parameters selected by an abnormality sign determination unit.

FIG. 8 is a diagram which shows an example of two measurement parameters selected by the abnormality sign determination unit 43. In the example shown in FIG. 8, the abnormality sign determination unit 43 selects a "AA line outlet flow rate" as a first measurement parameter. Then, the abnormality sign determination unit 43 first selects a "BB pump bearing temperature" as a second measurement parameter. Next, the abnormality sign determination unit 43 selects an "AA line inlet temperature" as the second measurement parameter. Then, the abnormality sign determination unit 43 selects a "CC line outlet temperature" as the second measurement parameter. In this manner, the abnormality sign determination unit 43 selects all combinations of two measurement parameters among the plurality of measurement parameters. Then, the abnormality sign determination unit 43 obtains a correlation value indicating correlation strength between the selected first measurement parameter and second measurement parameter for all the combinations. The abnormality sign determination unit 43 obtains a sum of correlation values of all the combinations of the first measurement parameter and the second measurement parameter as an abnormality indication value.

Figure 9:
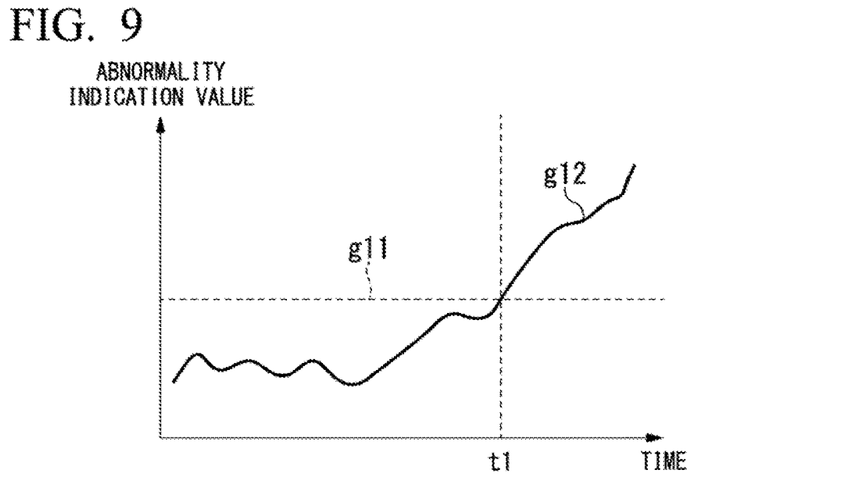
FIG. 9 is a diagram which shows an example of an abnormality indication value and an alarm transmission threshold value.

FIG. 9 is a diagram which shows an example of an abnormality indication value and an alarm transmission threshold value.

In FIG. 9, the horizontal axis represents time, and the vertical axis represents an abnormality indication value. A broken line g11 represents an alarm transmission threshold value, and a waveform g12 represents a change in abnormality indication value over a time. In the example shown in FIG. 9, the abnormality indication value exceeds the alarm transmission threshold value at a time t1.

The abnormality sign determination unit 43 obtains a contribution degree for the abnormality index value of each measurement parameter at the time t1 when the monitoring indication value has exceeded the alarm transmission threshold value.

Figure 10:
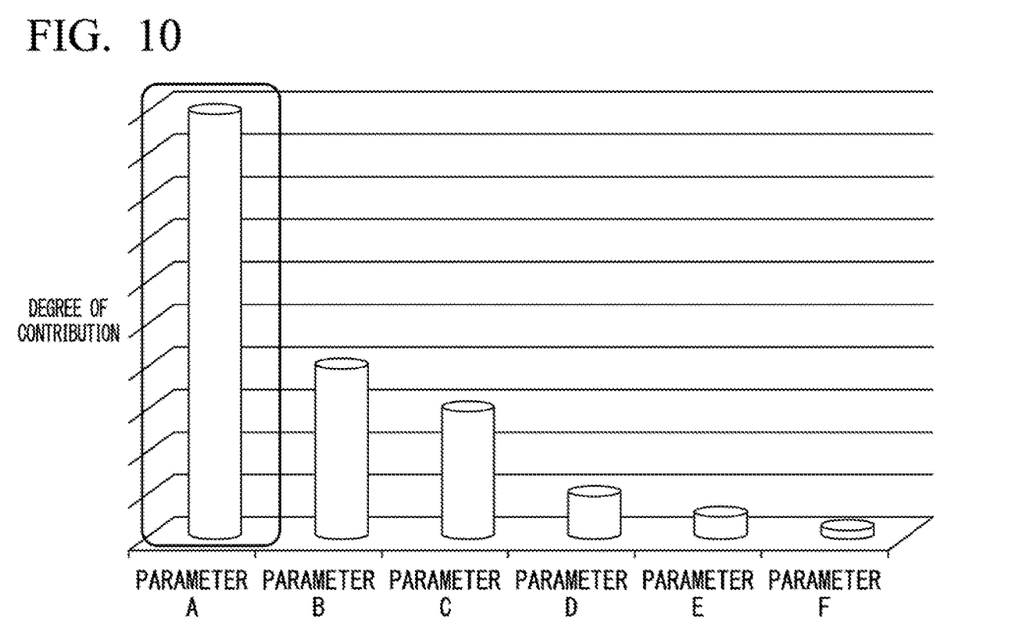
FIG. 10 is a diagram which shows an example of a contribution degree of a measurement parameter to a generated event.

FIG. 10 is a diagram which shows an example of the contribution degree of a measurement parameter for a generated event. In FIG. 10, the horizontal axis represents a type of a measurement parameter and the vertical axis represents a contribution degree.

In the example shown in FIG. 10, examples of a measurement parameter with a high contribution degree to the abnormality index value include a parameter A, a parameter B a parameter C, a parameter D, a parameter E, and a parameter F in order. As shown in FIG. 10, a measurement parameter with the highest contribution degree at a time t is the parameter A in FIG. 9.

In this manner, the abnormality sign determination unit 43 extracts a measurement parameter with a high contribution degree at a time at which the abnormality indication value has exceeded the alarm transmission threshold value. Note that the abnormality sign determination unit 43 may extract at least one measurement parameter with a high contribution degree and extract two or more.

The abnormality sign determination unit 43 individually monitors a measurement parameter by comparing an actual value and a predicted value for the extracted measurement parameter with a high contribution degree.

Figure 11:
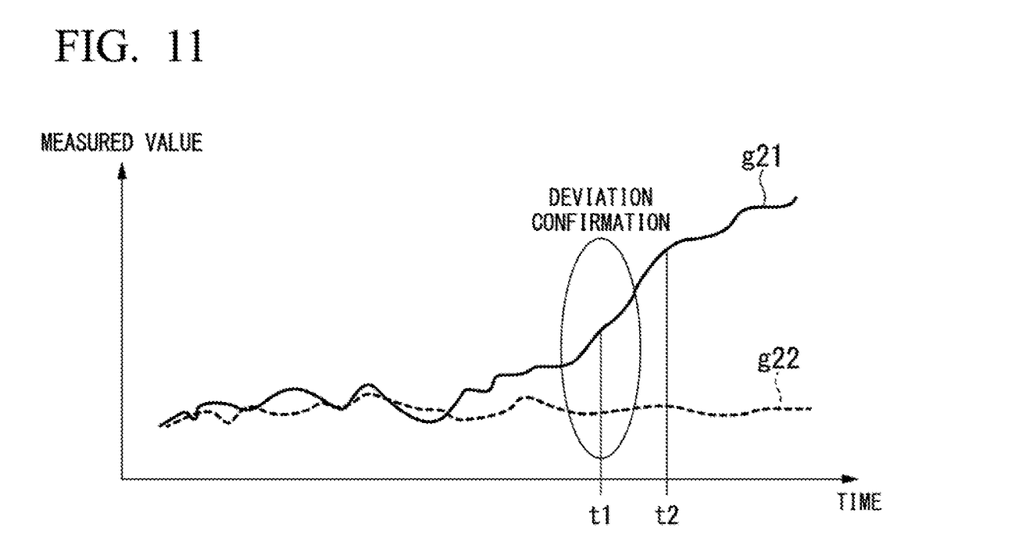
FIG. 11 is a diagram which shows an example of measurement parameter monitoring.

FIG. 11 is a diagram which shows an example of measurement parameter monitoring. In FIG. 11, the horizontal axis represents time and the vertical axis represents a measured value. In addition, a waveform g21 represents an actual value and a waveform g22 represents a predicted value.

In the examples shown in FIGS. 9 and 10, the abnormality sign determination unit 43 selects the parameter A as a measurement parameter with a high contribution degree. Then, the abnormality sign determination unit 43 reads a predicted value (or an actual value during normal) of a change in the measured value over a time of the parameter A stored in the storage unit 42. The abnormality sign determination unit 43 compares the predicted value and the actual value and monitors a deviation state between the predicted value and the actual value. The abnormality sign determination unit 43 monitors the deviation state between the actual value and the predicted value of the parameter A after the time t1, and detects that an abnormality sign occurs in the parameter A at a time t2 at which a difference between the actual value and the predicted value is equal to or greater than a deviation threshold value. The abnormality sign determination unit 43 outputs a result of detecting an abnormality sign to the abnormality diagnosis device 5 when it is detected that there is an abnormality sign.

Note that the abnormality sign monitoring device 4 may perform notification from a notifier (not shown) when an abnormality indication value has exceeded an alarm transmission threshold value. In addition, when the abnormality indication value has exceeded the alarm transmission threshold value, the abnormality sign monitoring device 4 may cause a displayer (not shown) to display a measurement parameter with a high contribution degree and the contribution degree.

Note that the abnormality sign method described above is an example, and the present invention is not limited thereto. For example, the method may be performed as described in Japanese Unexamined Patent application. First Publication No. 2015-62730 of Patent Document 1 in the prior art document.

As described above, the abnormality sign monitoring device 4 is intended to detect an abnormality sign in an operation cycle. For this reason, the abnormality sign monitoring device 4 may have a difficulty to detect an abnormality sign due to a broken correlation when respective behaviors of measurement parameters between the N cycle and the N+1 cycle are different.

For this reason, in the present embodiment, when the behavior of the N+1 cycle is abnormal, this measurement parameter is selected not to be output to the abnormality sign determination unit 43. Alternatively, in the present embodiment, this measurement parameter is excluded from the measurement parameter to be output to the abnormality sign monitoring device 4. In other words, in the present embodiment, an abnormality sign caused by a discontinuous change of a measurement parameter is screened in advance, and is excluded from an input of the abnormality sign monitoring device 4 that monitors an abnormality in an operation cycle.

As a result, according to the present embodiment, erroneous detection of the abnormality sign monitoring device 4 can be reduced by selecting a measurement parameter to be output to the abnormality sign monitoring device 4. As a result, according to the present embodiment, it is possible to improve accuracy of the abnormality diagnosis system 1 at the time of identifying an abnormal event.

In addition, in the present embodiment, instead of inputting a measurement parameter itself to the abnormality sign monitoring device 4, a monitoring target is selected by the monitoring target selecting device 3 described above and is input to the abnormality sign monitoring device 4.

Moreover, in the present embodiment, a behavior of a measurement parameter before abnormality sign monitoring is analyzed (patterned) and classified. In addition, comparison is performed between operation cycles (for example, a previous operation cycle and a current operation cycle) in the present embodiment.

As described above, in the present embodiment, a measurement parameter having a normal behavior is selected from a plurality of measurement parameters acquired by the monitoring target selecting device 3 and the selected measurement parameter is output to the abnormality sign monitoring device 4 when an abnormality sign of the nuclear power generation plant is detected on the basis of a correlation value indicating a mutual relationship between the measurement parameters.

As described above, in the present embodiment, even if the correlation is broken when the measurement parameter changes discontinuously, such as an operation cycle is different, a measurement parameter having a normal behavior is selected and the selected measurement parameter is output to the abnormality sign monitoring device 4. As a result, according to the present embodiment, it is possible to solve a problem that makes it difficult to detect an abnormality sign in an operation cycle and to identify an abnormal event.

In addition, in the example described above, an example in which the abnormality diagnosis system 1 is applied to the nuclear power generation plant has been described, but the present invention is not limited thereto. The abnormality diagnosis system 1 can be applied to a thermal power generation plant, a hydraulic power generation plant, a wind power generation plant, a solar power generation plant, and the like. In this case, the first period and the second period may be periods corresponding to the respective power generation plants.

Note that a program for realizing all or a part of functions of the monitoring target selecting device 3 in the present invention is recorded in a computer-readable recording medium and a computer system is caused to read and execute this program recorded in the recording medium, and thereby all or a part of the processing performed by the monitoring target selecting device 3 may be performed. Note that the "computer-readable recording medium" herein includes hardware such as peripheral devices and an OS. In addition, the "computer system" includes a WWW system having a homepage providing environment (or a display environment). In addition, the "computer-readable recording medium" refers to a flexible disk, a magneto-optical disc, a portable medium such as a ROM and a CD-ROM, and a storage device such as a hard disk embedded in the computer system. Furthermore, the "computer readable recording medium" includes those that hold a program for a certain period of time like a volatile memory (RAM) in the computer system that is a server or a client when the program is transmitted via a network such as the Internet or a communication line such as a telephone line.

In addition, the program described above may be transmitted from a computer system in which this program is stored in a storage device and the like to another computer system via a transmission medium or by a transmission wave in a transmission medium. Here, the "transmission medium" for transmitting the program refers to a medium having a function of transmitting information, like a network such as the Internet or a communication line (communication line) such as a telephone line. Moreover, the program described above may be for realizing a part of the functions described above. Furthermore, the program may also be a so-called difference file (difference program) that can realize the functions described above in combination with a program already recorded in the computer system.

As described above, although modes for implementing the present invention have been described using the embodiments, the present invention is not limited to these embodiments, and various modifications and substitutions can be made within a range not departing from the gist of the present invention.

INDUSTRIAL APPLICABILITY

According to at least one aspect among the aspects described above, the monitoring target selecting device can reduce erroneous detection and identify an abnormal event and the like effectively in the abnormality diagnosis system.

REFERENCE SIGNS LIST

1 Abnormality diagnosis system
3 Monitoring target selecting device
4 Abnormality sign monitoring device
5 Abnormality diagnosis device
31 Acquisition unit
32 Storage unit
33 Target selection unit
34 Output unit
35 Trend monitoring unit
331 Classification unit
332 Selection unit
41 Acquisition unit
42 Storage unit
43 Abnormality sign determination unit
51 Acquisition unit
52 Storage unit
53 Abnormality diagnosis control unit

The invention claimed is:

1. A monitoring target selecting device which is configured to output a measurement parameter to an abnormality sign monitoring device that is configured to detect an abnormality sign of a plant on the basis of a correlation value representing a correlation between a plurality of the measurement parameters of the plant, the abnormality sign indicating that an operation state of the plant has a possibility to be abnormal, comprising:
 a classification unit configured to acquire a plurality of measurement parameters measured in the plant, classify a change behavior of measured value over a time for each of the plurality of measurement parameters in a first period, and classify a change behavior of a measured value over a time for each of the plurality of measurement parameters in a second period which is a period after the first period; and
 a selection unit configured to,
  when the behavior of the measurement parameter in the first period is the same as the behavior of the measurement parameter in the second period, select this measurement parameter as a measurement parameter to be output to the abnormality sign monitoring device on the basis of a result of comparing a behavior of the measurement parameter in the first period and a behavior of the measurement parameter in the second period, and
  when a difference between the behavior of the measurement parameter in the first period and the behavior of the measurement parameter in the second period exists, determine whether the difference is normal or abnormal on the basis of information stored in a storage unit in advance, and select this measurement parameter as the measurement parameter to be output to the abnormality sign monitoring device in case that the difference is determined to be normal, wherein the classification unit is configured to classify the measurement parameter, on the basis of an inclination value of a measured value over a time, into a first behavior whose inclination value is equal to or greater than a classification threshold value, a second behavior whose absolute value of the inclination value is less than the classification threshold value, and a third behavior whose absolute value of the inclination value is equal to or greater than the classification threshold value when the inclination value is a negative value.

2. The monitoring target selecting device according to claim 1, wherein, when the classification results of the behavior of the measurement parameter in the first period and the behavior of the measurement parameter in the second period are the same, the selection unit selects the measurement parameter to be output to the abnormality sign monitoring device.

3. The monitoring target selecting device according to claim 1, wherein, when a ratio or difference between mean values of the measurement parameter in each period is within a range of a first predetermined value in case that the behavior of the measurement parameter in the first period and the behavior of the measurement parameter in the second period are the second behavior, the selection unit selects the measurement parameter to be output to the abnormality sign monitoring device.

4. The monitoring target selecting device according to claim 1, wherein, when a ratio or difference between respective inclination values is within a range of a second predetermined value in case that the behavior of the measurement parameter in the first period and the behavior of the measurement parameter in the second period are the first behavior, the selection unit selects the measurement parameter to be output to the abnormality sign monitoring device.

5. The monitoring target selecting device according to claim 1, wherein, when respective inclination values are negative values and a ratio or difference between respective inclination values is within a range of a second predetermined value in case that the behavior of the measurement parameter in the first period and the behavior of the measurement parameter in the second period are the third behavior, the selection unit selects the measurement parameter to be output to the abnormality sign monitoring device.

6. The monitoring target selecting device according to claim 1, further comprising:

a storage unit configured to store the behavior of the measurement parameter in the first period and the behavior of the measurement parameter in the second period for each measurement parameter, wherein the selection unit refers to information stored in the storage unit, and selects the measurement parameter to be output to the abnormality sign monitoring device when the behavior of the measurement parameter in the second period is normal:

when the behavior of the measurement parameter in the first period is different from the behavior of the measurement parameter in the second period;

when a ratio or difference between mean values of the measurement parameter in each period is outside the range of a first predetermined value in case that the behavior of the measurement parameter in the first period and the behavior of the measurement parameter in the second period are the second behavior;

when a ratio between respective inclination values is outside a predetermined range in case that the behavior of the measurement parameter in the first period and the behavior of the measurement parameter in the second period are the first behavior; or when respective inclination values are negative values and a ratio or difference between respective inclination values is outside the range of a second predetermined value in case that the behavior of the measurement parameter in the first period and the behavior of the measurement parameter in the second period are the third behavior.

7. A monitoring target selecting method of a monitoring target selecting device which is configured to output a measurement parameter to an abnormality diagnosis abnormality sign monitoring device that is configured to detect an abnormality sign of a plant on the basis of a correlation value representing a correlation between a plurality of the measurement parameters of the plant, the abnormality sign indicating that an operation state of the plant has a possibility to be abnormal, the method comprising:

a step of acquiring, by a classification unit, a plurality of measurement parameters measured in the plant and classifying a change behavior of a measured value over a time for each of the plurality of measurement parameters in a first period;

a step of classifying, by the classification unit, a change behavior of a measured value over a time for each of the plurality of measurement parameters in a second period which is a period after the first period; and a step of, when the behavior of the measurement parameter in the first period is the same as the behavior of the measurement parameter in the second period, selecting this measurement parameter to be output to the abnormality sign monitoring device on the basis of a result of comparing a behavior of the measurement parameter in the first period and a behavior of the measurement parameter in the second period, and when a difference between the behavior of the measurement parameter in the first period and the behavior of the measurement parameter in the second period exists, determining whether the difference is normal or abnormal on the basis of information stored in a storage unit in advance, and selecting this measurement parameter as the measurement parameter to be output to the abnormality sign monitoring device in case that the difference is determined to be normal, by the selection unit, wherein in steps of classifying the behaviors of the measurement parameters in the first and second period, classifying the measurement parameter, on the basis of an inclination value of a measured value over a time, into a first behavior whose inclination value is equal to or greater than a classification threshold value, a second behavior whose absolute value of the inclination value is less than the classification threshold value, and a third behavior whose absolute value of the inclination value is equal to or greater than the classification threshold value when the inclination value is a negative value, by the classification unit.

8. A non-transitory computer readable medium that stores a program causes a computer of a monitoring target selecting device which is configured to output a measurement parameter to an abnormality sign monitoring device that is configured to detect an abnormality sign of a plant on the basis of a correlation value representing a correlation between a plurality of the measurement parameters of the plant, the abnormality sign indicating that an operation state of the plant has a possibility to be abnormal, to execute     a procedure of acquiring a plurality of measurement parameters measured in the plant and classifying a change behavior of a measured value over a time for each of the plurality of measurement parameters in a first period;

a procedure of classifying a change behavior of a measured value over a time for each of the plurality of measurement parameters in a second period which is a period after the first period; and     a procedure of, when the behavior of the measurement parameter in the first period is the same as the behavior of the measurement parameter in the second period, selecting this measurement parameter to be output to the abnormality sign monitoring device on the basis of a result of comparing a behavior of the measurement parameter in the first period and a behavior of the measurement parameter in the second period, and when a difference between the behavior of the measurement parameter in the first period and the behavior of the measurement parameter in the second period exists, determining whether the difference is normal or abnormal on the basis of information stored in a storage unit in advance, and selecting this measurement parameter as the measurement parameter to be output to the abnormality sign monitoring device in case that the difference is determined to be normal, by the selection unit, wherein the classification unit is configured to classify the measurement parameter, on the basis of an inclination value of a measured value over a time, into a first behavior whose inclination value is equal to or greater than a classification threshold value, a second behavior whose absolute value of the inclination value is less than the classification threshold value, and a third behavior whose absolute value of the inclination value is equal to or greater than the classification threshold value when the inclination value is a negative value.

* * * * *